United States Patent [19]

Uccellini

[11] 4,226,349
[45] Oct. 7, 1980

[54] CARTON GRIP

[76] Inventor: Anthony J. Uccellini, 137 Linda La., Palm Beach Shores, Fla. 33404

[21] Appl. No.: 55,965

[22] Filed: Jul. 9, 1979

[51] Int. Cl.³ .............................................. B65D 25/28
[52] U.S. Cl. .................. 224/45 P; 220/94 R; 16/110 R; 16/114 R; 224/45 H; 229/52 AM
[58] Field of Search .................. 224/45 P, 45 R, 45 Q, 224/45 T, 50, 55, 45 H; 220/94 R; 16/110 R, 110.5, 114 R, 124, DIG. 28

[56] References Cited

U.S. PATENT DOCUMENTS

| 423,621 | 3/1890 | Morrison | 229/52 AM |
|---|---|---|---|
| 1,721,683 | 7/1929 | Barker | 16/124 |
| 2,206,314 | 7/1940 | Werner | 229/33 X |
| 2,617,143 | 11/1952 | Blake | 224/45 R |

Primary Examiner—Steven M. Pollard
Attorney, Agent, or Firm—Barry L. Haley; Eugene F. Malin; Philip R. Wadsworth

[57] ABSTRACT

A pair of temporary hand grips for engaging the lateral sides of a fibrous box, such as cardboard, that includes a plurality of pointed projections oriented in a forty-five degree angle from a flat planar wall that engage opposite vertical, lateral sides of a container. Each improved grip includes a resilient strap connected across the hand engaging side of the grip. The lower portion of the body of the grip includes a curved surface for engagement of the fingers and spacing from the pointed projection wall to allow the fingers sufficient space between curved portion and the carton wall. The point projections are sized and angled so as to not puncture the container being gripped.

2 Claims, 6 Drawing Figures

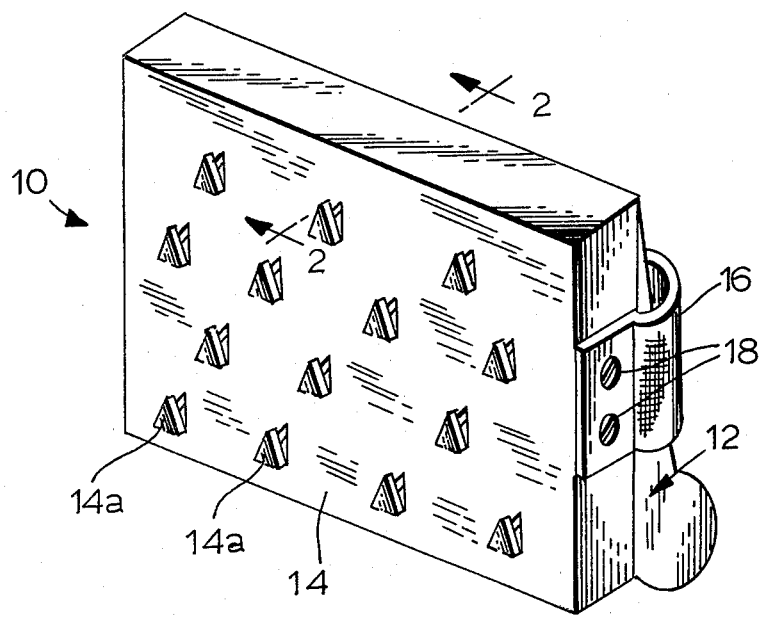
FIG.1
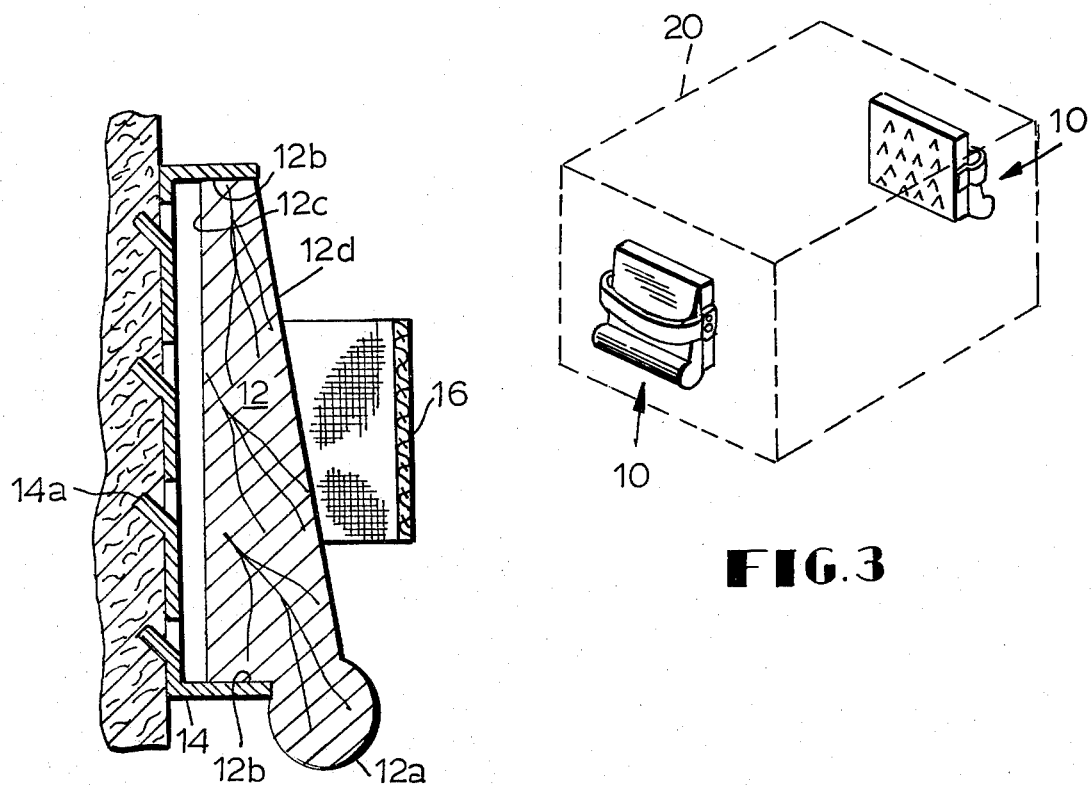
FIG.3
FIG.2

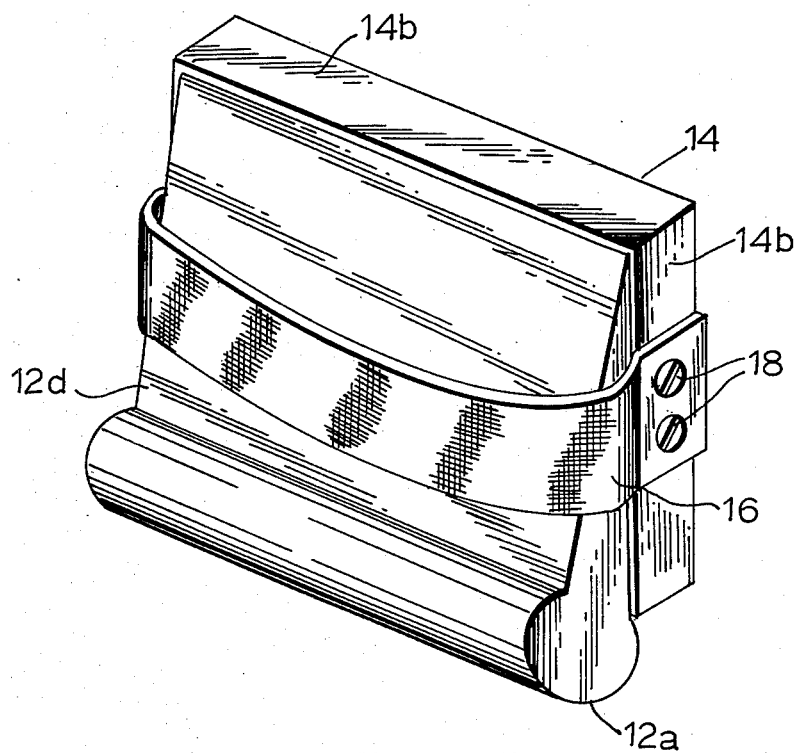
FIG.4
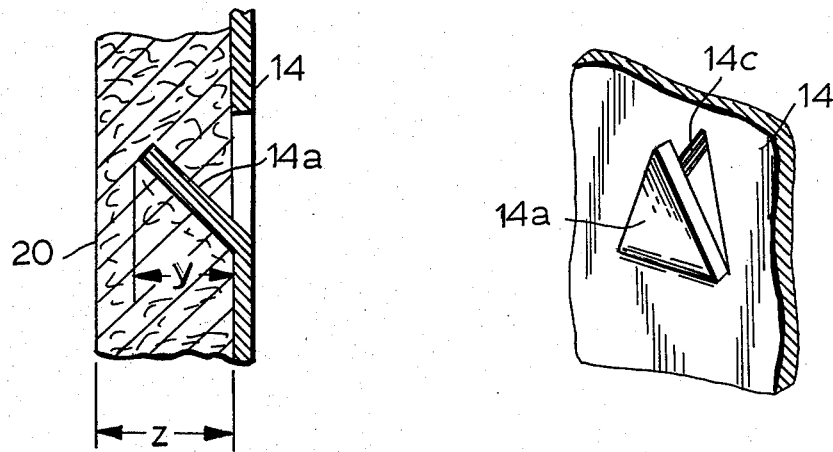
FIG.5
FIG.6

CARTON GRIP

BACKGROUND OF THE INVENTION

This invention relates generally to a temporary grip that is removably attachable to the vertical wall of a container. Specifically, the device is related to a pair of hand grips which are useful in allowing one to more easily and readily lift a cardboard box.

Most cardboard boxes are constructed with smooth lateral vertical sides that make them difficult to lift. Often the person lifting the cardboard box must try to get his fingers beneath the bottom of the box, which by its sheer size, makes it cumbersome in an attempt to lift the box. The use of permanent handles on fibrous containers made of cardboard or like is more expensive and is oftentimes impractical since most boxes are knocked down for storage, and stacked in flat piles. Additional projections from the sides of each box would make stacking impractical. It is also desirous when handling cartons and boxes and the like that the container surface not be punctured. This could cause damage to the contents inside or expose the inner contents to moisture or other undesirable elements, bugs or dust which is undesirable. One box handle is shown in the prior art in U.S. Pat. No. 2,206,314 issued to Werner, July 2, 1940. Werner shows a permanent handle that is mounted through a slot in the side of the container, the handle being also used to permanently secure the container together. The primary deficiency in the Werner device is that the carton must be permanently punctured in order for the handle to work. Secondly, it protrudes into the container and also requires that the fastener be bent downward against the container wall.

The present invention provides a temporary grip or handle for a carton or box which can be instantly attached on each side of the box by simple manipulation, used for lifting the box and just as quickly removed without puncturing or damaging the inside of the box. The lifting capacity of the present invention has been tested by successfully lifting up to 125 pounds without damaging the cardboard box.

BRIEF DESCRIPTION OF THE INVENTION

A temporary grip used in pairs for use in lifting a fibrous container such as a cardboard box or the like comprising a rigid body having disposed on one side a flat planar surface, a curved, partially cylindrical, base portion separated from the flat planar surface, a tapered wall eminating at one end from the cylindrical portion at the bottom, tapered toward the top of the body from the side opposite the flat planar surface, a steel plate disposed over said flat planar surface, said steel plate having a plurality of pointed projections disposed upwardly at approximately a forty-five degree angle relative to the flat planar surface, said steel plate having a perimeter pressed onto the rigid body, and a flexible strap connected to said rigid body on each side and disposed over said tapered wall portion.

The steel plate may be made of galvanized steel with the pointed projections being punched out of the plate prior to its mounting on the rigid body. The rigid body may be made of any substantial material such as plastic, wood or metal to provide sufficient rigidity for lifting fibrous cartons of substantial weight, if necessary.

The strap is employed to allow engagement with the back of the hand for additional lifting support which is inserted through the strap, with the fingers being wrapped about the lower cylindrical portion of the rigid body. The cylindrical portion is spaced sufficiently from the steel plate surface which engages the container walls to allow enough space for the fingers to easily be disposed between the container wall and the handled formed by the cylindrical surface. The tapered wall in conjunction with the cylindrical handle or finger engaging portion allows for a natural bending of the hand inwardly for a better grasp.

The pointed projections are sized for use with conventional containers of standard thickness or may be specifically designed for particular container thickness. For example, if a standard three-quarter inch cardboard container is contemplated the penetration of the pointed projection would be much less than the thickness of the cardboard and in fact is such as to not penetrate into the second layer of cardboard, if laminated. The pointed projection pattern or array is selected to insure a number of projections along the base and additional projections spaced for maximum holding power.

To utilize the device, a pair of grips are used in which the hands are placed beneath the strap with the fingers engaging the lower circular base portion, with the arms straddling the container on each side. The pointed projections are engaged on the side of the box in the box in an upward lifting motion. To remove the handle, a downward force is applied and the handles easily slide away from the box.

It is object of this invention to provide a temporary handle for a fibrous container, such as a cardboard box, which may be easily attached or removed from the box and which greatly enhances the ability of one to easily lift the box in almost any position.

And yet another object of this invention is to provide a removable grip for use with fibrous-like containers for ease in manipulation and lifting of the container without damaging the contents of the container or without puncturing through the walls of the container.

And yet still another object of this invention is to provide an improved handle for a box that may be easily attached or removed without affecting the dimensional or storage characteristics of the box, the device being capable of construction at low cost.

In accordance with these and other objects which will be apparent hereinafter, the instant invention will now be described with particular reference to the accompanying drawings.

BRIEF DESCRIPTION OF THE DRAWINGS

FIG. 1 shows a front perspective view of one grip embodying the instant invention.

FIG. 2 shows a side elevational view in cross-section along line 2—2 of FIG. 1.

FIG. 3 shows a pair of grips embodying the instant invention positioned relative to a carton (shown in phantom) as they would be employed in use of the device.

FIG. 4 shows a rear perspective view of the instant invention.

FIG. 5 shows a fragmentary side elevational view of one of the pointed projections embedded in a fibrous carton wall as used in the instant invention.

FIG. 6 is a perspective view of one of the pointed projections.

PREFERRED EMBODIMENT OF THE INVENTION

Referring now to the drawings and specifically FIG. 1, the instant invention is shown generally at 10 comprised of a rigid body 12 having a plate 14 attached on one side, the plate having a plurality of pointed projections 14a upwardly disposed therefrom. A strap 16 is attached by screws 18 to the rigid body 12 and plate 14 side on each side.

Referring now to FIG. 2, the rigid body 12 includes a flat planar surface 12c and a peripheral lateral edge 12b spaced from the flat planar surface 12c, separating the flat planar surface from a partially cylindrical base 12a. A tapered wall 12d joins the cylindrical base 12a near the base at one end and the lateral peripheral lip 12b at the top. The cylindrical base portion 12a is for engagement of the fingers when the hand is disposed through strap 16. The steel plate 14 (having projections 14a which penetrate at approximately a forty-five degree angle into the fibrous vertical wall 20) is pressed during manufacture onto the peripheral lateral wall 12b. This provides for a firm attachment of the plate 14 to the rigid body 12 in conjunction with the screws 18 shown in FIG. 1. The steel plate wall portion 14b which is pressed onto the body 12 has sufficient lateral depth from the flat surface 14 relative to the cylindrical body wall 12a to allow the fingers of one using the device plenty of room between the wall of the container 20 and the finger engaging portion 12a when the grip is in use.

FIG. 3 shows the employment of a pair of grips as shown herein which are manually positioned on opposite parallel walls of a fibrous container 20 (shown dotted).

FIG. 4 shows the opposite side of the device from that shown in FIG. 1 which includes tapered wall 12d which has an enlarged body portion near the base 12a and which narrows near the top of the device. The tapered wall 12d aids in providing a tight, comfortable fit of a hand within the strap 16, the strap providing support to the hand during lifting.

FIG. 5 shows one of the pointed projections 14a which is stamped out in the steel plate 14 such that the distance "y" from the tip of the point to the plate surface is approximately equal to one-half the anticipated wall thickness "z" of the carton. The desired angle of the pointed projection relative to the flat wall 14 is approximately a fortyfive degree angle which allows for sufficient penetration of the container wall for reliable grip of the device and for necessary vector forces to act to retain the projection within the carton when lifting. The plane of each pointed projection in the array (FIG. 1) is essentially parallel.

FIG. 6 shows the projection 14a which is stamped out from metal plate 14 leaving an aperture 14c in the plate itself.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A removable grip for attachment to a fibrous container wall, said grip comprising:
    a rigid body, said body having a curved hand-engagable base portion;
    a plate having a plurality of pointed projections disposed therefrom at a predetermined angle pointed upwardly, said plate being attached to said rigid body, said plate and said curved portion of said rigid body having lateral separation to allow the fingers of the user sufficient space therebetween.

2. The device as in claim 1, including:
    a strap connected on each side of said body disposed across the side of the body opposite said plate for supporting a hand disposed therethrough.

* * * * *